(12) United States Patent
Dwyer, Jr. et al.

(10) Patent No.: US 6,672,606 B1
(45) Date of Patent: Jan. 6, 2004

(54) SUSPENSION FOR PERSONAL MOBILITY VEHICLE

(75) Inventors: Edward Joseph Dwyer, Jr., Pittsgrove, NJ (US); Stephen John Jarema, Newfield, NJ (US)

(73) Assignee: Electric Mobility Corporation

( * ) Notice: Subject to any disclaimer, the term of this patent is extended or adjusted under 35 U.S.C. 154(b) by 24 days.

(21) Appl. No.: 09/971,166

(22) Filed: Oct. 4, 2001

(65) Prior Publication Data (65)

Related U.S. Application Data (60) Provisional application No. 60/238,344, filed on Oct. 5, 2000.

(51) Int. Cl.$^7$ .......................... B60G 11/36; B62D 27/06
(52) U.S. Cl. .......................... 280/124.165; 280/124.17; 280/124.175; 280/124.179; 280/124.128; 280/124.131; 180/208; 267/231; 267/41; 267/240
(58) Field of Search .................. 180/208, 215, 180/216, 11, 16; 280/124.165, 124.17, 124.175, 124.179, 124.128, 124.131; 267/231, 245, 28, 29, 41, 239, 240

(56) References Cited

U.S. PATENT DOCUMENTS

| | | | | |
|---|---|---|---|---|
| 990,756 A | * | 4/1911 | Lend | 267/231 |
| 1,097,975 A | * | 5/1914 | Hassler | 267/239 |
| 1,209,746 A | * | 12/1916 | Morse | 267/28 |
| 1,409,600 A | * | 3/1922 | Smith | 267/239 |
| 1,434,017 A | * | 10/1922 | McCarthy | 267/239 |
| 1,553,343 A | * | 9/1925 | Walsh | 267/234 |
| 1,558,588 A | * | 10/1925 | Burdine | 267/28 |
| 1,591,144 A | * | 7/1926 | Rousseau | 267/231 |
| 3,483,937 A | * | 12/1969 | Vann | 180/208 |
| 4,325,449 A | * | 4/1982 | D'Addio et al. | 180/217 |
| 4,944,359 A | * | 7/1990 | Doman et al. | 180/208 |
| 5,240,086 A | * | 8/1993 | Hopely, Jr. | 180/208 |
| 6,439,331 B1 | * | 8/2002 | Fan | 180/208 |

FOREIGN PATENT DOCUMENTS

| | | | |
|---|---|---|---|
| GB | 2 205 284 A | * | 12/1988 |
| JP | 03281491 A | * | 12/1991 |
| JP | 04329952 A | * | 11/1992 |
| JP | 06078955 A | * | 3/1994 |

* cited by examiner

*Primary Examiner*—Paul N. Dickson
*Assistant Examiner*—Ruth Ilan
(74) *Attorney, Agent, or Firm*—Frijouf, Rust & Pyle P.A.

(57) ABSTRACT

An improved suspension system is disclosed for a personal mobility vehicle comprising an arm assembly pivotably mounted to a fame section. A wheel assembly is connected to the arm assembly. A spring is interposed between the arm assembly and the second frame section for resiliently suspending the wheel assembly relative to the frame section. In one example of the invention, the frame section comprises a rigid frame section of the personal mobility vehicle. In another example of the invention, the frame section comprises a resilient leaf spring resiliently suspending the assembly of the personal mobility vehicle. In another example of the invention, a resilient coil spring interposed between the arm assembly the resilient leaf spring for providing a multiple resilient suspension for the wheel assembly.

13 Claims, 8 Drawing Sheets

SUSPENSION FOR PERSONAL MOBILITY VEHICLE

CROSS-REFERENCE TO RELATED APPLICATIONS

This application claims benefit of U.S. Patent Provisional application serial No. 60/238,344 filed Oct. 5, 2000. All subject matter set forth in provisional application serial number 60/238,344 is hereby incorporated by reference into the present application as if fully set forth herein.

BACKGROUND OF THE INVENTION

1. Field of the Invention

This invention relates to personal mobility vehicles and more particularly to an improved suspension system for providing a resiliently mounted wheel assembly.

2. Background of the Invention

The aging population has provided a substantial increase in the use of personal mobility vehicles. Personal mobility vehicles provide persons with partial or total walking disabilities with an increased range and greater flexibility in locomotion. The increased use of personal mobility vehicles has required the development of more technically superior features that enable the personal mobility vehicle to be used in various locations and terrains.

Personal mobility vehicles have a pair of powered rear wheels and a steerable front wheel configured in the general appearance of a miniature golf cart. The track of the rear wheels of the adz personal mobility vehicle is generally narrower than a wheelchair. The personal mobility vehicle is usually designed for a tight turning radius such that the vehicles are more maneuverable than a wheelchair. In addition, the personal mobility vehicle is designed for use in places which are not specifically designed for wheelchair use.

Initially, personal mobility vehicles were used on regular or even surfaces such as interior floors of building structures such as residential and commercial buildings as well as paved sidewalks and walkways adjacent thereto. Personal mobility vehicles are now being used on irregular or uneven surfaces such as field surfaces, grass surfaces, ground paths and the like. The use of personal mobility vehicles on such irregular or uneven surfaces requires the personal mobility vehicles to have an improved suspension system in order to provide the operator with a comfortable and safe ride. Unfortunately, the suspension systems of personal mobility vehicles of the prior art were adapted for use on regular or even surfaces and accordingly did not function well on irregular or uneven services.

Others in the prior art have attempted to provide personal mobility vehicles that are suitable for use on regular or even finished surfaces as well as irregular or uneven surfaces. The following U.S. patents are representative of the attempts of the prior art to provide a personal mobility vehicle having a suspension system suitable for use on regular or even surfaces as well as irregular or uneven surfaces.

Others in the prior art have provided personal mobility of vehicles that may be readily disassembled to facilitate transportation in conventional automobiles. Representative examples of personal mobility vehicles capable of being disassembled are illustrated in the following U.S. patents.

U.S. Pat. No. 4,909,525 to Flowers discloses a convertible personal vehicle having a take-apart frame comprising front and rear frame sections which can be disassembled and assembled. The frame sections are secured together by a pivotable detachable connection such that the rear frame section is lockingly received in the rear portion of the front frame section and the length of the assembled frame is substantially the same as the length of the front frame section itself. An auxiliary frame section is also provided which can be readily attached to the powered rear frame section to provide improved mobility in those situations in which space for turning is limited.

U.S. Pat. No. 4,947,955 to Hopely, Jr. discloses a personal vehicle having a take-apart frame comprising front and rear frame sections which can be disassembled and assembled. The frame sections are secured together by a pivotable detachable connection such that the rear frame section is lockingly received in the rear portion of the front frame section and the length of the assembled frame is substantially the same as the length of the front frame section itself.

U.S. Pat. No. 5,240,086 to Hopely, Jr. discloses a removable drive train from frame of a personal mobility vehicle comprising front and rear frame sections which can be readily disassembled and assembled and further comprises a drive train unit which can be disassembled and assembled from the rear frame section.

Therefore, it is an object of the present invention to provide an improved suspension system for a personal mobility vehicle that provides superior comfort and performance regular on even surfaces as well as irregular or uneven services.

Another object of this invention is to provide an improved suspension system for a personal mobility vehicle that provides a superior ride for an operator heretofore unknown in the art.

Another object of this invention is to provide an improved suspension system for a personal mobility vehicle that is suitable for use on regular or even surfaces as well as irregular or uneven surfaces.

Another object of this invention is to provide an improved suspension system for a personal mobility vehicle that is readily adaptable for use with personal mobility vehicles having a take-apart frame.

Another object of this invention is to provide an improved suspension system for a personal mobility vehicle that comprises a rigid frame section of the personal mobility vehicle for supporting the improved suspension system.

Another object of this invention is to provide an improved suspension system for a personal mobility vehicle that comprises a resilient leaf spring for resiliently suspending the assembly of the personal mobility vehicle.

Another object of this invention is to provide an improved suspension system for a personal mobility vehicle that comprises a resilient coil spring interposed between the arm assembly the resilient leaf spring for providing a multiple resilient suspension for the wheel assembly.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

An improved suspension system is disclosed for a personal mobility vehicle comprising an arm assembly pivotably mounted to a fame section. A wheel assembly is connected to the arm assembly. A spring is interposed between the arm assembly and the second frame section for resiliently suspending the wheel assembly relative to the frame section.

In one example of the invention, the frame section comprises a rigid frame section of the personal mobility vehicle. In another example of the invention, the frame section comprises a resilient leaf spring resiliently suspending the assembly of the personal mobility vehicle. In another example of the invention, a resilient coil spring is interposed between the arm assembly the resilient leaf spring for providing a multiple resilient suspension for the wheel assembly.

In a more specific example of the invention, the arm assembly comprises a pair of arms extending from the second frame section. The wheel assembly comprises a pair of wheels respectively connected to the pair of arms of the arm assembly. The arm assembly comprises a left and a right arm extending from the second frame section. The wheel assembly comprises a left and a right wheel respectively connected to the left and right arms of the arm assembly.

In another example of the invention, the spring comprises a resilient coil spring interposed between the arm assembly and the second frame section. The spring comprises a pin extending between the arm assembly and the second frame section. A resilient coil spring encircles the pin and is interposed between the arm assembly and the second frame section.

In another embodiment of the invention, the personal mobility vehicle comprises a first frame section and a second frame section. A first coupling is connected to the first frame section of the personal mobility vehicle. A second coupling is connected to the second frame section of the personal mobility vehicle. The first coupling is enagagable with the second coupling for interconnecting the first and second frame sections. An arm assembly is pivotably mounted to the second frame section of the personal mobility vehicle. A wheel assembly is connected to the arm assembly. A spring is interposed between the arm assembly and the second frame section for resiliently suspending the wheel assembly relative to the second frame section.

In still another embodiment of the invention, the personal mobility vehicle comprises a first frame section having a first coupling and a second frame section having a second coupling. The second frame section has a resilient leaf spring. The first coupling is enagagable with the second coupling for interconnecting the first and second frame sections. An arm assembly is pivotably mounted to the second frame section of the personal mobility vehicle with a wheel assembly being connected to the arm assembly. A resilient coil spring is interposed between the arm assembly and the second frame section for cooperating with the resilient leaf spring for resiliently suspending the wheel assembly relative to the second frame section.

In a further embodiment of the invention, the personal mobility vehicle comprises a frame section having a resilient leaf spring. An arm assembly is pivotably mounted to the resilient leaf spring with a wheel assembly being connected to the arm assembly. A resilient coil spring is interposed between the arm assembly and the resilient leaf spring for providing a multiple resilient suspension for the wheel assembly.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
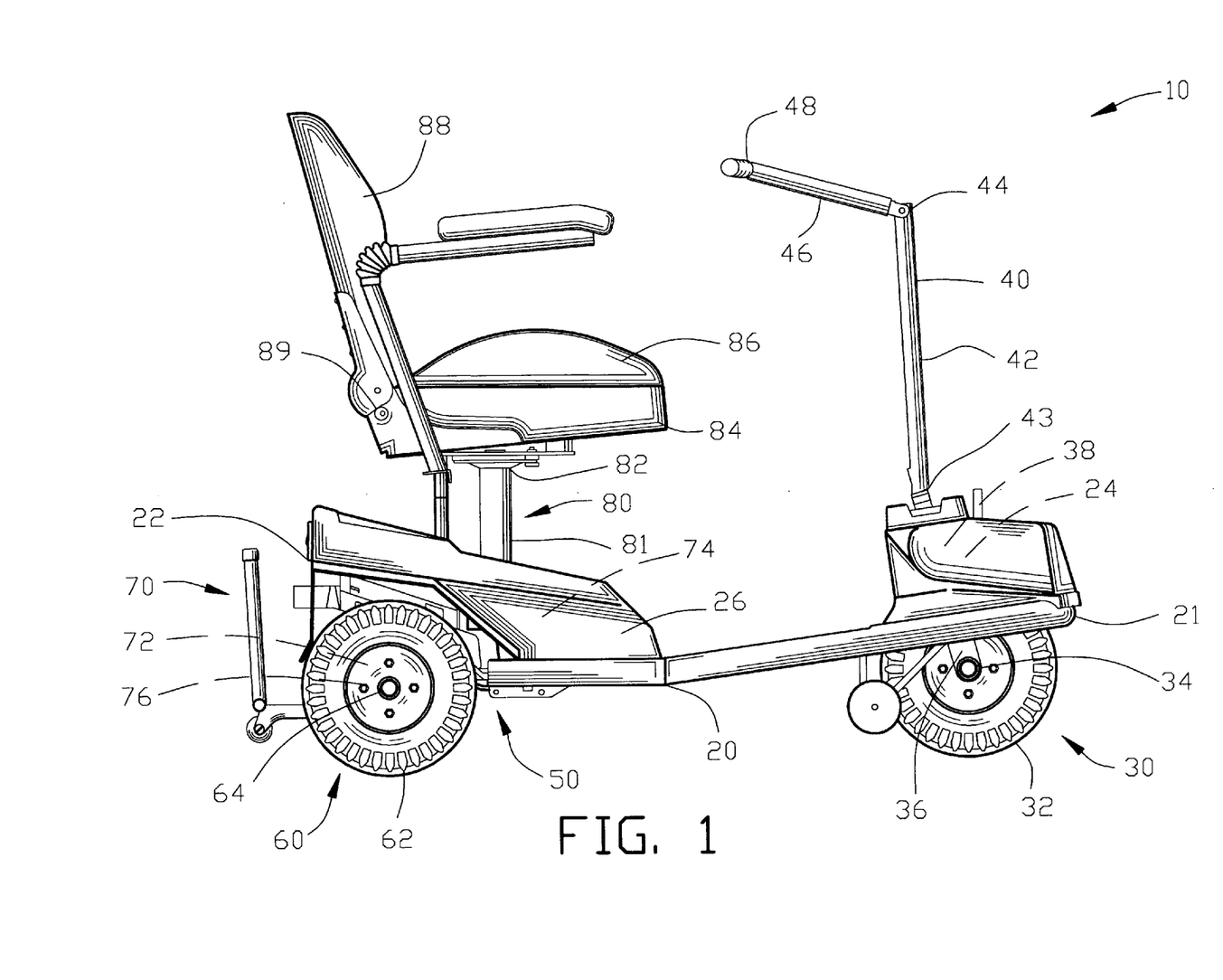
FIG. 1 is a side elevational view of a personal mobility vehicle.

FIG. 1 is a side elevational view of a personal mobility vehicle 10 for transporting an operator (not shown). The personal mobility vehicle 10 includes a frame assembly 20 extending between a front end 21 and a rear end 22 of the personal mobility vehicle 10. The front end 21 of the frame assembly 20 supports a steering bearing 24. The frame assembly 20 is shown covered by a body 26.

A front wheel assembly 30 comprises a front wheel 32 rotatably mounted on a front axle 34. The front axle 34 is secured to opposed legs of a fork 36. The fork 36 is connected to a fork pivot 38 rotatably mounted within the steering bearing 24 in the frame assembly 20. The fork pivot 38 extends through the frame assembly 20.

A steering assembly 40 comprises a stem 42 extending between a lower end 43 and an upper end 44. The lower end 43 of the stem 42 is connected to the fork pivot 38 and extends through the frame assembly 20. A handlebar 46 is connected to the upper end 44 of the stem 42. The handlebar 46 enables the operator (not shown) to control the rotational position of the front wheel 32 to alter the direction of the personal mobility vehicle 10. Preferably, the handlebar 46 includes control switches 48 for controlling the personal mobility vehicle 10.

A suspension system 50 interconnects a rear wheel assembly 60 and a drive assembly 70 to the frame assembly 20. The suspension system 50 absorbs any shock imparted when a rear wheel 62 of the rear wheel assembly 60 engages or encounters an irregular or uneven surface.

The rear wheel assembly 60 comprises plural rear wheels 62 mounted on a rear axle 64. The rear axle 64 is rotatably mounted to the second end 22 of the frame 20 by the suspension system 50. The drive assembly 70 comprises an electric motor 72 powered by a battery pack 74 for driving the plural rear wheels 62. Preferably, the electric motor 72 drives the plural rear wheels 62 through drive coupling 76 such as a transmission or the like. In the alternative, the electric motor 72 may drive the plural rear wheels 62 directly through the rear axle 64. The control switches 48 located on the handlebar 46 are connected to the electric motor 72 for enabling the operator to control the speed and the rotational direction of the rear wheels 62.

Preferably, the battery pack 74 is a rechargeable battery located within a battery case. The preferred rechargeable battery is a jelled cell battery to avoid leakage of battery chemicals should the battery pack be upset and for the ease of maintenance of such cells. The battery pack 74 is of the size employed on small boats as starting motors and weighs about twenty pounds.

A pedestal assembly 80 extends between a lower end 81 and an upper end 82 in a substantially vertical orientation. The lower end 81 of the pedestal assembly 80 is secured to the frame assembly 20. An upper end 82 of the pedestal assembly 80 extends upwardly for supporting the seat assembly 84. The seat assembly 84 comprises a seat portion 86 and a back portion 88. In this example, the back portion 88 of the seat assembly 84 is pivotably mounted to the seat portion 86 by a pivot 89 for accommodating the size and comfort of the operator. The seat assembly 84 may be rotatably mounted on the pedestal 80 for facilitating the ingress and egress of an operator on and off of the personal mobility vehicle 10.

Figure 2:
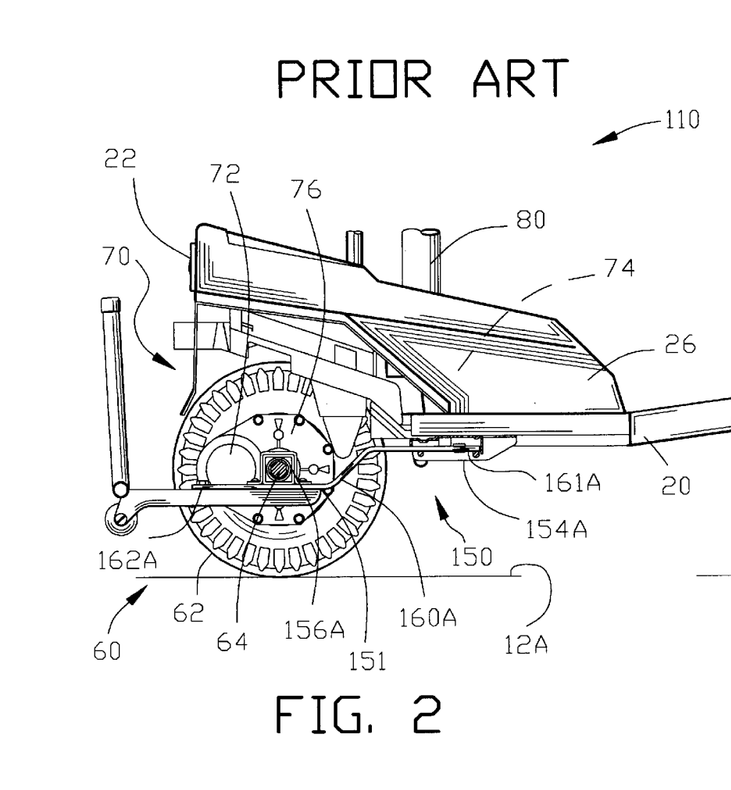
FIG. 2 is an enlarged side view of a prior art suspension system for the personal mobility vehicle of FIG. 1 located on an even surface.

FIG. 2 is an enlarged side view of a portion of FIG. 1 illustrating a portion of a prior art personal mobility vehicle 110 similar to the personal mobility vehicle 10 of FIG. 1 located on a regular or an even surface 12A. The prior art personal mobility vehicle 110 incorporates a suspension system 150 for resiliently supporting the rear wheel assembly 60 and the drive assembly 70.

The suspension system 150 of the prior art personal mobility vehicle 110 comprises a leaf spring suspension system 151. The leaf spring suspension system 151 comprises plural leaf springs with only one spring 160A being shown in FIG. 2. The plural leaf springs 160 resiliently mount the rear wheel assembly 60 and the drive assembly 70 to the frame assembly 20.

The leaf springs 160A extends between a first and a second end 161A and 162A. The first end 161A of the leaf springs 160A is connected to the frame assembly 20. The second end 162A of the leaf springs 160A supports the rear wheel assembly 60 and the drive assembly 70.

The first end 161A of the leaf springs 160A is received removably within a socket 154A secured to the frame assembly 20. The first end 161A of the suspension system 150 is removable from the socket 154A for enabling the rear wheel assembly 60 and the drive assembly 70 and the suspension system 150 to be readily removed from the personal mobility vehicle for transportation and/or storage. The second end 162A of the leaf springs 160A receives a mounting 156A for attaching to the rear wheel assembly 60 and the drive assembly 70.

Figure 3:
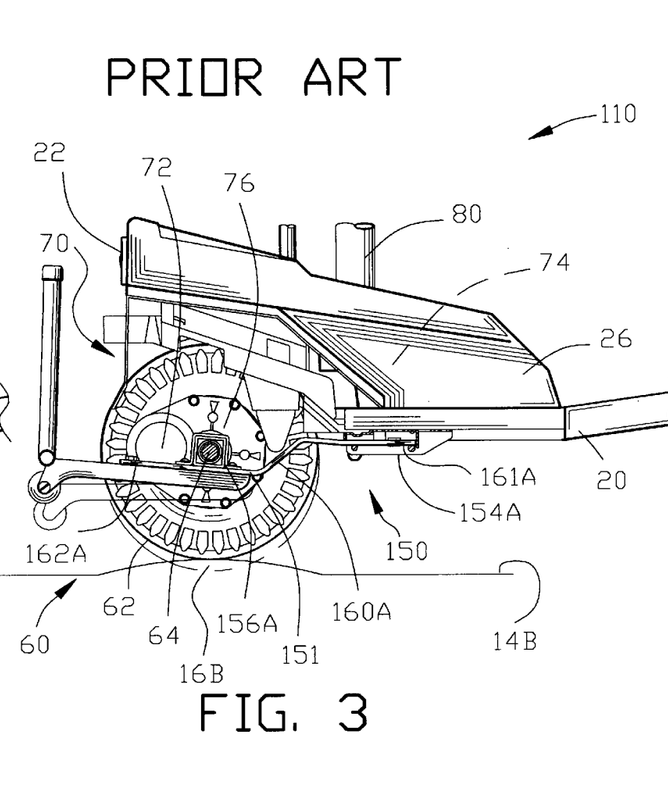
FIG. 3 is a view similar to FIG. 2 illustrating the prior art suspension system located on an uneven surface.

FIG. 3 is a view similar to FIG. 2 illustrating the prior art suspension system 150 located on an irregular or an uneven surface 14B. The irregular or uneven surface 14B includes a major bump 16B. The plural leaf springs 160 resiliently deflect to absorb the shock imparted when the rear wheel 62 of the rear wheel assembly 60 engages or encounters the major bump 16B. The leaf spring 160A is shown resiliently deflected or bent to absorb the shock imparted by the major bump 16B of FIG. 3.

Figure 4:
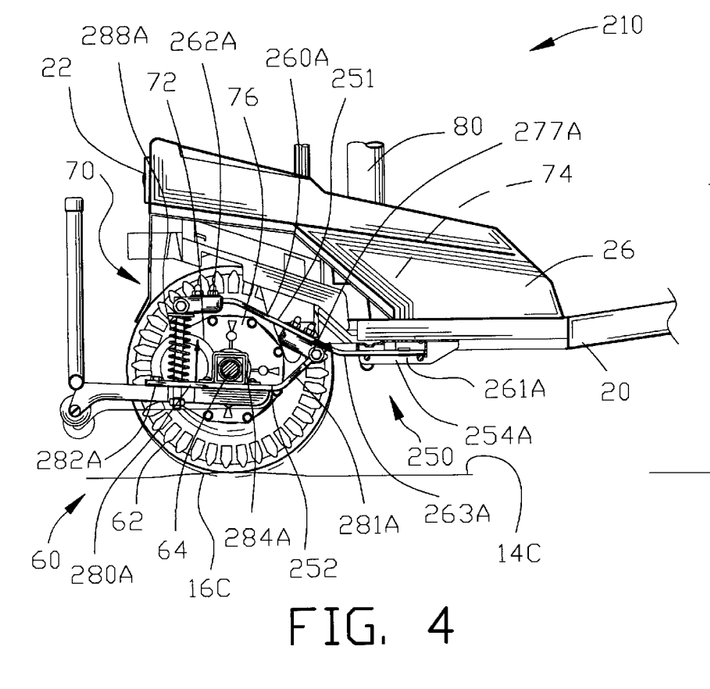
FIG. 4 is an enlarged side view of a first embodiment of a suspension system for the personal mobility vehicle of FIG. 1 incorporating the present invention located on a minor uneven surface.

FIG. 4 is an enlarged side view of a portion of FIG. 1 illustrating a portion of a personal mobility vehicle 210 incorporating a first embodiment of a suspension system 250 of the present invention. The personal mobility vehicle 210 is shown located on a minor irregular or minor uneven surface 14C having a minor bump 16C.

Figure 5:
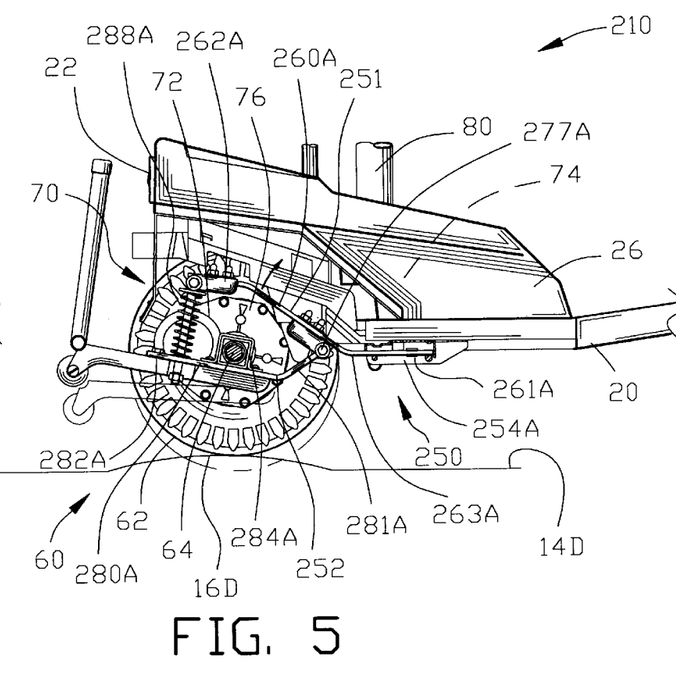
FIG. 5 is a view similar to FIG. 4 illustrating the first embodiment of the suspension system located on a major uneven surface.
Figure 6:
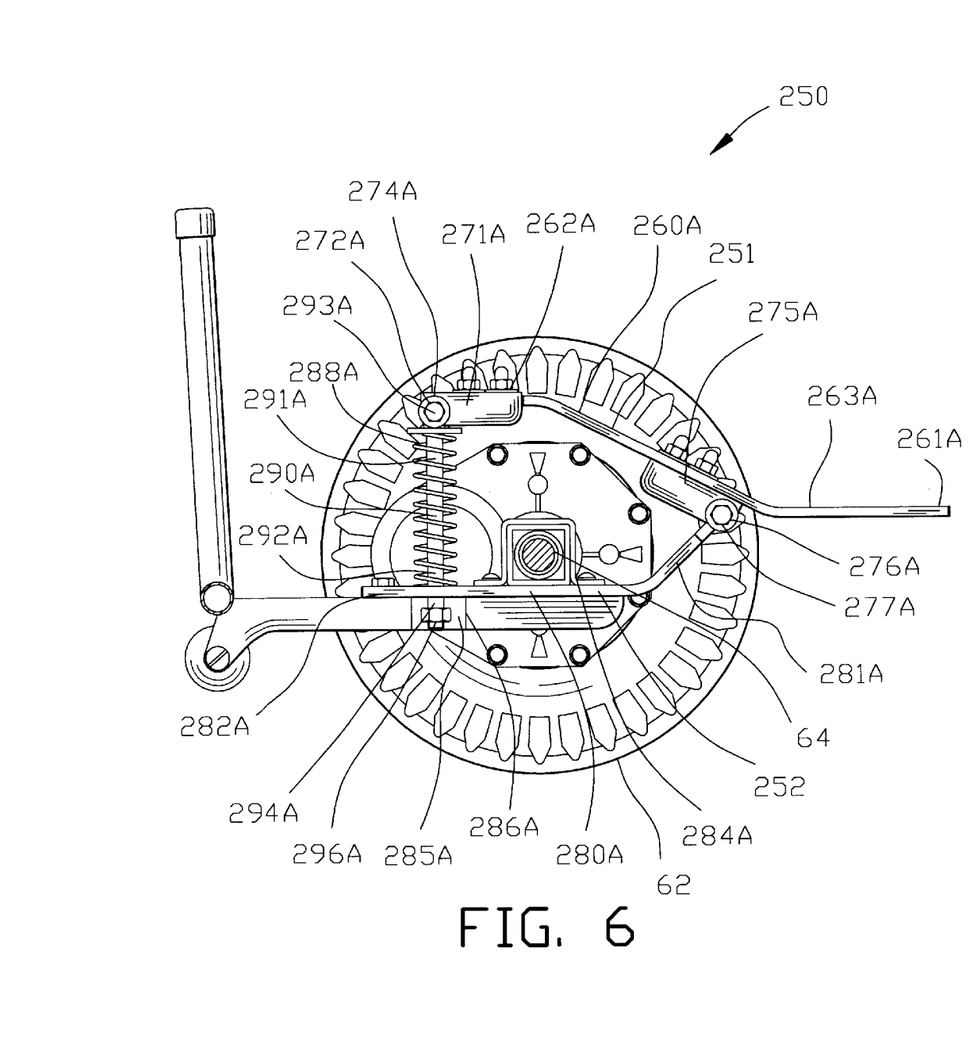
FIG. 6 is an enlarged view of the suspension system of FIGS. 4 and 5.
Figure 7:
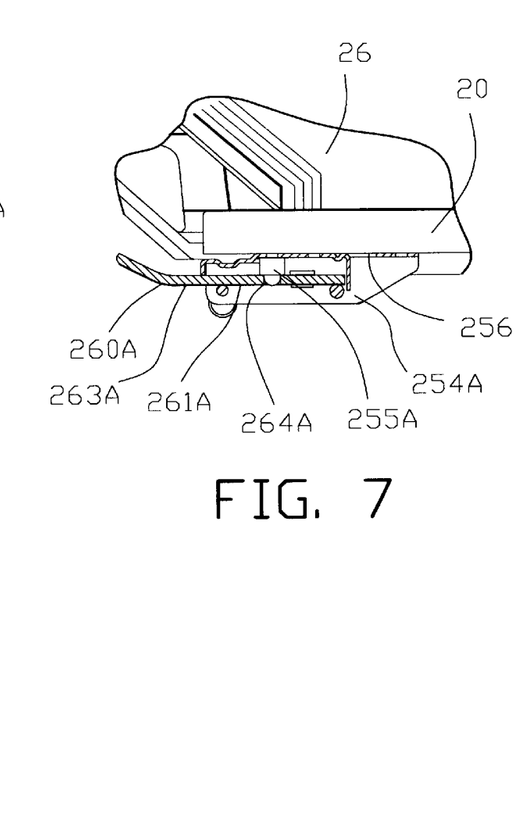
FIG. 7 is an enlarged view of a portion of the personal mobility vehicle of FIGS. 4 and 5.
Figure 8:
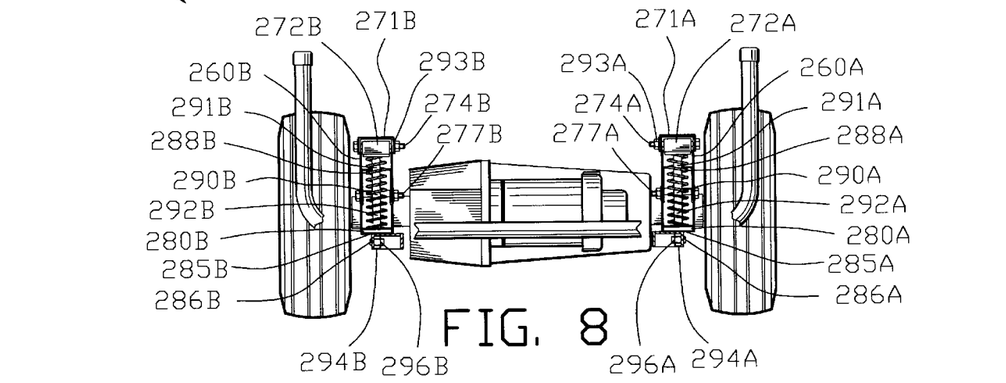
FIG. 8 is a rear view of FIG. 4.
Figure 9:
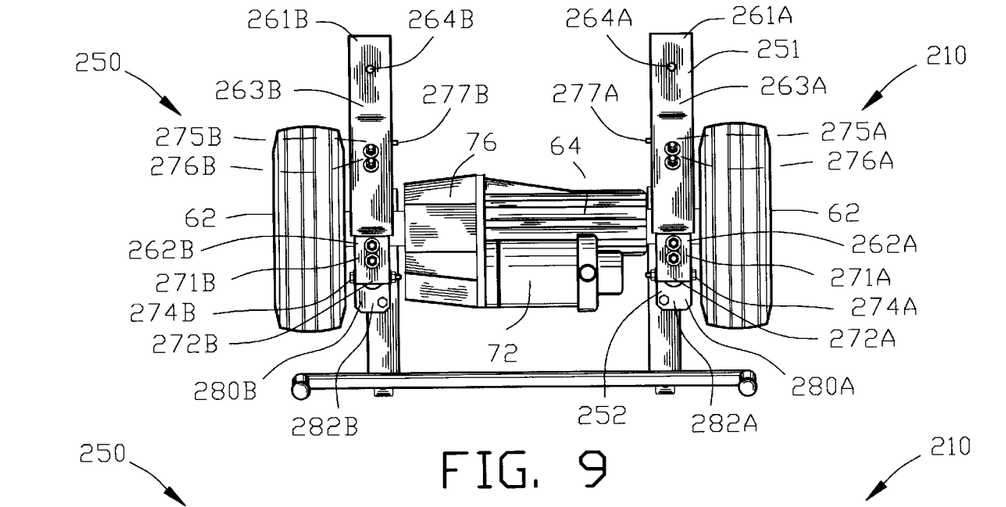
FIG. 9 is a top view of a portion of FIG. 8.

FIG. 5 is a view similar to FIG. 4 illustrating the personal mobility vehicle 210 located on a major irregular or major uneven surface 14D. The major irregular or major uneven surface 14D includes a major bump 16D. The first embodiment of a suspension system 250 of the present invention comprises a dual action suspension system 250.

The suspension system 250 comprises a leaf spring suspension assembly 251 in combination with a coil spring suspension assembly 252. The leaf spring suspension assembly 251 is established to have a stronger resilience then the coil spring suspension assembly 252.

The leaf spring suspension assembly 251 and the coil spring suspension assembly 252 are established such that only the coil spring suspension assembly 252 deflects under minor irregular or minor uneven surfaces 14C as shown by the minor bump 16C in FIG. 4. However, the leaf spring suspension assembly 251 and the coil spring suspension assembly 252 are established such that both the coil spring suspension assembly 252 and the leaf spring suspension assembly 251 deflect At under major irregular or major uneven surfaces 14D as shown by the major bump 16D in FIG. 5.

FIGS. 6–9 illustrate the various views of the personal mobility vehicle 210 further illustrating the leaf spring suspension assembly 251 and the coil spring suspension assembly 252 of the present invention. The leaf spring suspension assembly 251 comprises plural leaf springs 260A and 260B with each of the plural springs 260A and 260B extending between first ends 261A and 261B and second ends 262A and 262B. The leaf springs 260A and 260B are provided with leaf spring apertures 264A and 264B located in proximity to the first ends 261A and 261B of the leaf springs 260A and 260B.

The first ends 261A and 261B of the plural leaf springs 260A and 260B are received within plural socket 254A and 254B for securing the suspension system 250 to the personal mobility vehicle 210. The plural socket 254A and 254B enable the first ends 261A and 261B of the plural leaf springs 260A and 260B to be readily attached and readily removed therefrom. The first ends 261A and 261B of the plural leaf springs 260A and 260B are retained within the plural sockets 254A and 254B by locking pins 255A and 255B. The locking pins 255A and 255B extend through the leaf spring apertures 264A and 264B within the plural leaf springs 260A and 260B and apertures within the plural sockets 254A and 254B for securing the leaf springs 260A and 260B within the plural sockets 254A and 254B.

The second ends 262A and 262B of the plural leaf springs 260A and 260B of the present invention shown in FIGS. 4–7 extend upwardly from the frame assembly 20. In contrast, the prior art leaf spring 160A extends downwardly from the frame assembly 20 as shown in the FIGS. 2 and 3. The plural leaf springs 260A and 260B of the present invention extend substantially horizontally from the first ends 261A and 261B to intermediate portions 263A and 263B of the plural leaf springs 260A and 260B. The plural leaf springs 260A and 260B of the present invention extend upwardly from the intermediate portions 263A and 263B to the second ends 262A and 262B of the plural leaf springs 260A and 260B.

The second ends 262A and 262B of the plural leaf springs 260A and 260B receive upper attachments 271A and 271B. The upper attachments 271A and 271B are secured to the second ends 262A and 262B of the plural leaf springs 260A and 260B by suitable means such as a mechanical fastening, welding or the like. The upper attachments 271A and 271B include apertures 272A and 272B for receiving upper pivot pins 274A and 274B.

Plural intermediate attachments 275A and 275B are secured to the plural leaf springs 260A and 260B intermediate the first ends 261A and 261B and second ends 262A and 262B of the plural leaf springs 260A and 260B. The intermediate attachments 275A and 275B are secured to the plural leaf springs 260A and 260B by suitable means such as a mechanical fastening, welding or the like. The intermediate attachments 275A and 275B include pivot apertures 276A and 276B for receiving intermediate pivot pins 277A and 277B.

The coil spring suspension assembly 252 of the present invention comprises plural lower suspension members 280A and 280B and plural coil springs 288A and 288B. The lower suspension members 280A and 280B extend between first ends 281A and 281B and second ends 282A and 282B. The first ends 281A and 282B of the lower suspension members 280A and 280B are pivotably mounted by the intermediate pivot pins 277A and 277B of the intermediate attachments 275A and 275B to the intermediate portion 263A and 263B of the plural leaf springs 260A and 260B.

The plural lower suspension members 280A and 280B receives the plural mountings 284A and 284B for attaching the rear wheel assembly 60 and the drive assembly 70. The plural mountings 284A and 284B may be secured to the plural lower suspension members 280A and 280B by suitable means such as a mechanical fastening, welding or the like.

The plural lower suspension members 280A and 280B receive lower attachments 285A and 285B. In this embodiment of the invention, the lower attachments 285A and 285B are shown as apertures 286A and 286B extending through the second ends 282A and 282B of the plural lower suspension members 280A and 280B.

The plural coil spring 288A and 288B are interposed between the upper attachments 271A and 271B of the plural leaf springs 260A and 260B and the lower attachments 285A and 285B of the plural lower suspension members 280A and 280B. Plural shafts 290A and 290B are disposed within the plural coil spring 288A and 288B for retaining the plural coil spring 288A and 288B between the upper attachments 271A and 271B and the lower attachments 287A and 287B.

The shafts 290A and 290B have first ends 291A and 291B having apertures 293A and 293B for receiving the upper pivot pins 274A and 274B. The upper pivot pins 274A and 274B pivotably mount the shafts 290A and 290B to the upper attachments 271A and 271B of the leaf spring suspension assembly 251.

The shafts 290A and 290B have second ends 292A and 292B having threads 294A and 294B for securing to the lower attachments 285A and 285B. The second ends 292A and 292B of the shafts 290A and 290B extend through the apertures 286A and 286B defined within the second ends 282A and 282B of the plural lower suspension members 280A and 280B. Plural bolts 296A and 296B engage with the threads 294A and 294B for securing the second ends 292A and 292B of the shafts 290A and 290B to the lower attachments 285A and 285B.

The plural leaf springs 260A and 260B of the leaf spring suspension assembly 251 are established to have a stronger resilience then the plural coil springs 288A and 288B of the coil spring suspension assembly 252. Accordingly, the plural coil springs 288A and 288B of the coil spring suspension assembly 252 will resiliently deflect or deform prior to the plural leaf springs 260A and 260B of the leaf spring suspension assembly 251.

Preferably, the plural coil spring 288A and 288B of the coil spring suspension assembly 252 are established to resiliently deflect or deform under minor irregular or minor uneven surface 14C as shown in FIG. 4. Similarly, the plural leaf springs 260A and 260B of the leaf spring suspension assembly 251 are established to resiliently deflect or deform under major irregular or major uneven surface 14D as shown in FIG. 5. The combination of the leaf spring suspension assembly 251 and the coil spring suspension assembly 252 forms a multiple resilient suspension system to provide superior comfort and performance on regular or even surfaces as well as irregular or uneven services.

Figure 10:
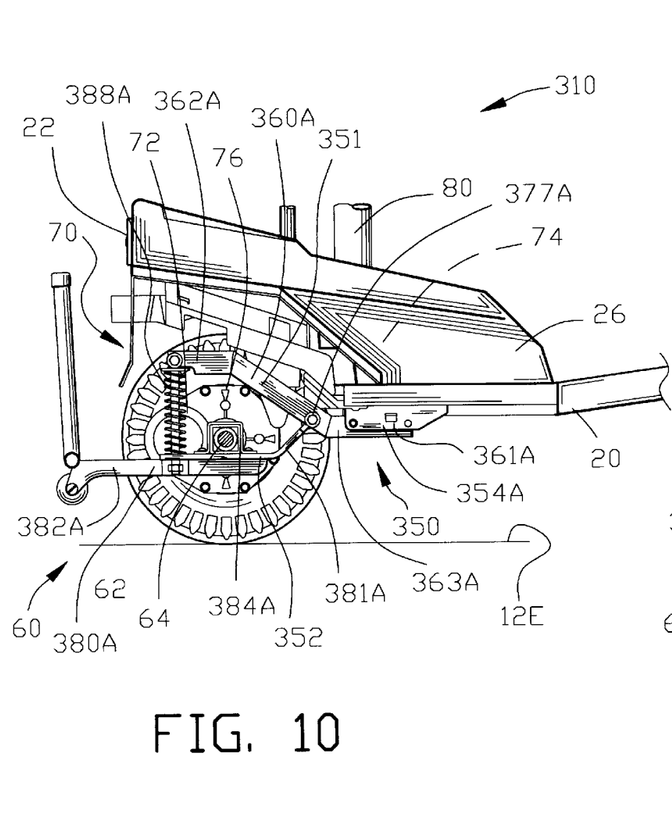
FIG. 10 is an enlarged side view of a second embodiment of a suspension system for the personal mobility vehicle of FIG. 1 incorporating the present invention located on an even surface.

FIG. 10 is an enlarged side view of a portion of FIG. 1 illustrating a portion of a personal mobility vehicle 310 incorporating a second embodiment of a suspension system 350 of the present invention. The personal mobility vehicle 310 is shown located on an even surface 12E.

Figure 11:
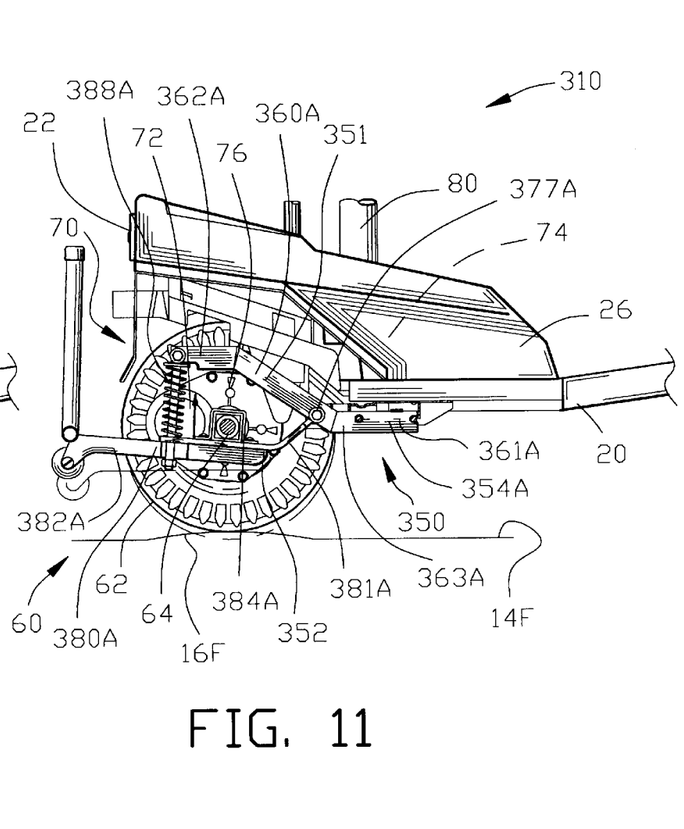
FIG. 11 is a view similar to FIG. 10 illustrating the second embodiment of the suspension system located on a major uneven surface.
Figure 12:
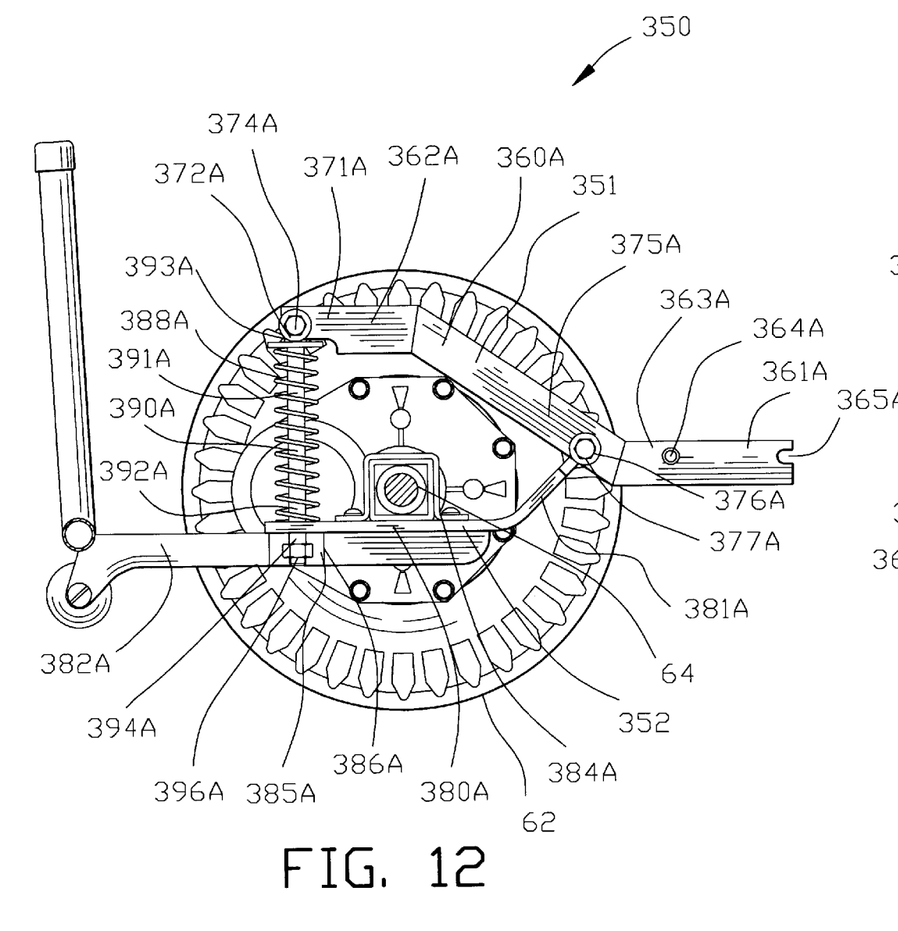
FIG. 12 is an enlarged view of the suspension system of FIGS. 10 and 11.
Figure 13:
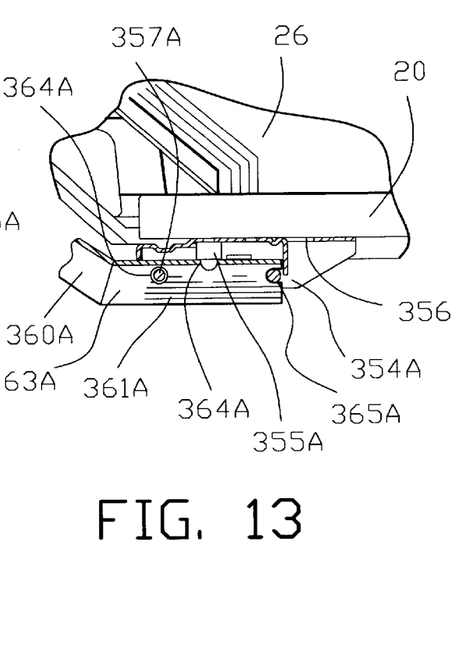
FIG. 13 is an enlarged view of a portion of the personal mobility vehicle of FIGS. 10 and 11.
Figure 14:
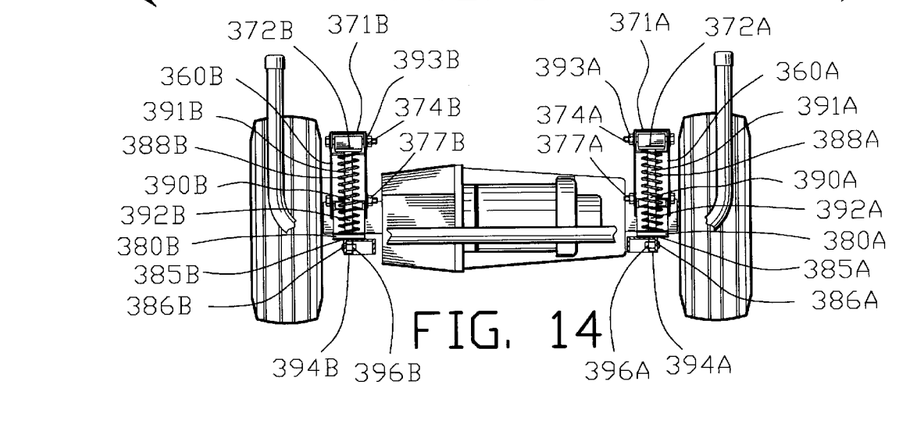
FIG. 14 is a rear view of FIG. 10.
Figure 15:
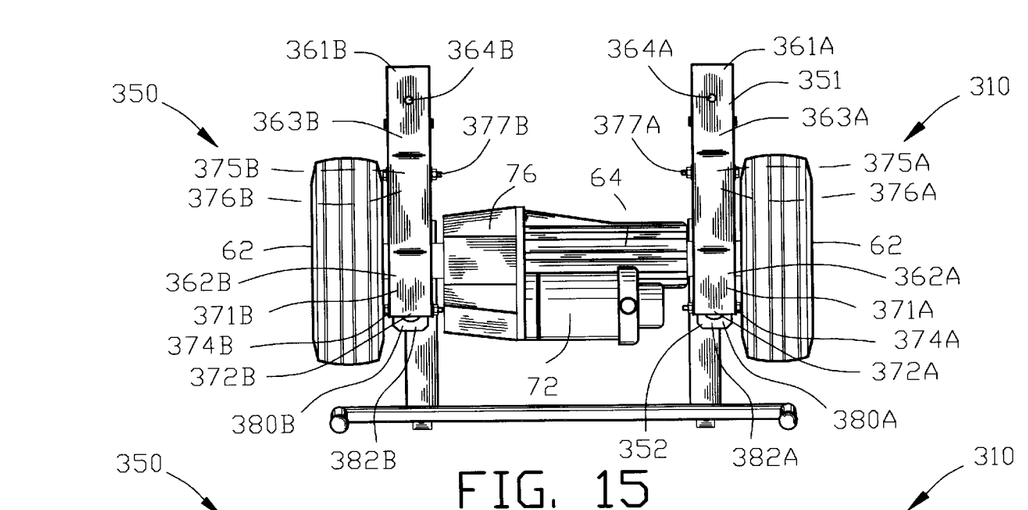
FIG. 15 is a top view of a portion of FIG. 14.

FIG. 11 is a view similar to FIG. 10 illustrating the personal mobility vehicle 310 located on a major irregular or major uneven surface 14E. The major irregular or major uneven surface 14F includes a major bump 16F. The second embodiment of a suspension system 350 of the present invention comprises a single action suspension system 350.

The suspension system 350 comprises a coil spring suspension assembly 352. The coil spring suspension assembly 352 is designed to be interchangeable with the suspension system 250 shown in FIGS. 4–9. The ability to interchange the suspension system 350 with the suspension system 250 shown in FIGS. 4–9 enables the personal mobility vehicle 10 to be customized to the specific needs of the operator (not shown).

FIGS. 12–15 illustrate the various views of the personal mobility vehicle 310 further illustrating the coil spring suspension assembly 352 of the present invention. The suspension system 350 comprises plural upper supports 360A and 360B with each of the plural upper supports 360A and 360B extending between first ends 361A and 361B and second ends 362A and 362B. The upper supports 360A and 360B are provided with upper support apertures 364A and 364B located in proximity to the first ends 361A and 361B of the upper supports 360A and 360B.

The first ends 361A and 361B of the plural upper supports 360A and 360B are received within plural socket 354A and 354B for securing the suspension system 350 to the personal mobility vehicle 350. The plural socket 354A and 354B enable the first ends 361A and 361B of the plural upper supports 360A and 360B to be readily attached and readily removed therefrom.

The first ends 361A and 361B of the plural upper supports 360A and 360B are retained within the plural sockets 354A and 354B by locking pins 355A and 355B. The locking pins 355A and 355B extend through the upper support apertures 364A and 364B within the plural upper supports 360A and 360B and apertures within the plural sockets 354A and 354B for securing the upper supports 360A and 360B within the plural sockets 354A and 354B.

The second ends 362A and 362B of the plural upper supports 360A and 360B of the present invention shown in FIGS. 10–15 extend upwardly from the frame assembly 20. In contrast, the prior art upper support 160A extends downwardly from the frame assembly 20 as shown in the FIGS. 2 and 3. The plural upper supports 360A and 360B of the present invention extend substantially horizontally from the first ends 361A and 361B to intermediate portions 363A and 363B of the plural upper supports 360A and 360B. The plural upper supports 360A and 360B of the present invention extend upwardly from the intermediate portions 363A and 363B to the second ends 362A and 362B of the plural upper supports 360A and 360B.

The second ends 362A and 362B of the plural upper supports 360A and 360B receive upper attachments 371A and 371B. The upper attachments 371A and 371B are secured to the second ends 362A and 362B of the plural upper supports 360A and 360B by suitable means such as a mechanical fastening, welding or the like. The upper attachments 371A and 371B include apertures 372A and 372B for receiving upper pivot pins 374A and 374B.

Plural intermediate attachments 375A and 375B are secured to the plural upper supports 360A and 360B intermediate the first ends 361A and 361B and second ends 362A and 362B of the plural upper supports 360A and 360B. The intermediate attachments 375A and 375B are secured to the plural upper supports 360A and 360B by suitable means such as a mechanical fastening, welding or the like. The intermediate attachments 375A and 375B include pivot apertures 376A and 376B for receiving intermediate pivot pins 377A and 377B.

The coil spring suspension assembly 352 of the present invention comprises plural lower suspension members 380A and 380B and plural coil spring 388A and 388B. The lower suspension members 380A and 380B extend between first ends 381A and 381B and second ends 382A and 382B. The first ends 381A and 381B of the lower suspension members 380A and 380B are pivotably mounted by the intermediate pivot pins 377A and 377B of the intermediate attachments 375A and 375B to the intermediate portion 363A and 363B of the plural upper supports 360A and 360B.

The plural lower suspension members 380A and 380B receives the plural mountings 384A and 384B for attaching the rear wheel assembly 60 and the drive assembly 70. The plural mountings 384A and 384B may be secured to the plural lower suspension members 380A and 380B by suitable means such as a mechanical fastening, welding or the like.

The plural lower suspension members 380A and 380B receive lower attachments 385A and 385B. In this embodiment of the invention, the lower attachments 385A and 385B are shown as apertures 386A and 386B extending through the second ends 382A and 382B of the plural lower suspension members 380A and 380B.

The plural coil spring 388A and 388B are interposed between the upper attachments 371A and 371B of the plural upper supports 360A and 360B and the lower attachments 385A and 385B of the plural lower suspension members 380A and 380B. Plural shafts 390A and 390B are disposed within the plural coil spring 388A and 388B for retaining the plural coil spring 388A and 388B between the upper attachments 371A and 371B and the lower attachments 387A and 387B.

The shafts 390A and 390B have first ends 391A and 391B having apertures 393A and 393B for receiving the upper pivot pins 374A and 374B. The upper pivot pins 374A and 374B pivotably mount the shafts 390A and 390B to the upper attachments 371A and 371B of the upper support suspension assembly 351.

The shafts 390A and 390B have second ends 392A and 392B having threads 394A and 394B for securing to the lower attachments 385A and 385B. The second ends 392A and 392B of the shafts 390A and 390B extend through the apertures 386A and 386B defined within the second ends 382A and 382B of the plural lower suspension members 380A and 380B. Plural bolts 396A and 396B engage with the threads 394A and 394B for securing the second ends 392A and 392B of the shafts 390A and 390B to the lower attachments 385A and 385B.

The plural coil spring 388A and 388B of the coil spring suspension assembly 352 resiliently deflects or deforms under minor irregular or a minor uneven surface. In addition, plural coil spring 388A and 388B of the coil spring suspension assembly 352 resiliently deflects or deforms under major irregular or major uneven surface as shown by bump 16E in FIG. 11.

The present invention to provide an improved suspension system for a personal mobility vehicle is suitable for use on and provides superior comfort and performance on regular or even surfaces as well as irregular or uneven services. The improved suspension system provides a multiple resilient suspension for the wheel assembly through a combination of a leaf spring assembly and a coil spring assembly. The improved suspension system is readily adaptable for use with personal mobility vehicles having a take-apart frame.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved suspension system for a personal mobility vehicle, comprising:
   a frame section comprising a resilient leaf spring;
   said frame section comprising an arm assembly pivotably mounted to said resilient leaf spring to pivot below said resilient leaf spring;
   a wheel assembly having an axle being disposed transverse to said resilient leaf spring connected to said arm assembly;

a resilient coil spring interposed between said arm assembly and said frame section for cooperating with said resilient leaf spring for resiliently suspending said wheel assembly with said resilient coil spring acting in concert with said resilient leaf spring.

2. An improved suspension system for a personal mobility vehicle as set forth in claim 1, further comprising a pair of leaf springs, wherein said arm assembly comprises a pair of arms respectively extending from said resilient leaf springs and said wheel assembly comprises a pair of wheels respectively connected to said pair of arms of said arm assembly.

3. An improved suspension system for a personal mobility vehicle as set forth in claim 1, further comprising a pair of leaf springs, wherein said arm assembly comprises a left and a right arm respectively extending from said resilient leaf springs and said wheel assembly comprises a left and a right wheel of wheels respectively connected to said left and right arms of said arm assembly.

4. An improved suspension system for a personal mobility vehicle as set forth in claim 1, wherein said resilient coil spring comprises a pin extending between said arm assembly and said resilient leaf spring; and said resilient coil spring encircling said pin and interposed between said arm assembly and said resilient leaf spring.

5. An improved suspension system for a personal mobility vehicle, comprising:

a first frame section having a first coupling;

a second frame section having a second coupling;

said second frame section comprising a resilient leaf spring;

said second frame section comprising an arm assembly pivotably mounted below said resilient leaf spring;

a wheel assembly connected to said arm assembly;

a resilient coil spring interposed between said arm assembly and said resilient leaf spring for resiliently suspending said wheel assembly with said resilient coil spring acting in concert with said resilient leaf spring; and said first coupling being removably enagagable with said second coupling for removably securing said wheel assembly to said first frame section.

6. An improved suspension system for a personal mobility vehicle as set forth in claim 5, further comprising a pair of leaf springs, wherein said arm assembly comprises a pair of arms respectively extending from said resilient leaf springs and said wheel assembly comprises a pair of wheels respectively connected to said pair of arms of said arm assembly.

7. An improved suspension system for a personal mobility vehicle as set forth in claim 5, further comprising a pair of leaf springs, wherein said arm assembly comprises a left and a right arm respectively extending from said resilient leaf springs and said wheel assembly comprises a left and a right wheel of wheels respectively connected to said left and right arms of said arm assembly.

8. An improved suspension system for a personal mobility vehicle as set forth in claim 5, wherein said resilient coil spring comprises a pin extending between said arm assembly and said resilient leaf spring; and said resilient coil spring encircling said pin and interposed between said arm assembly and said resilient leaf spring.

9. An improved suspension system for a personal mobility vehicle, comprising:

a first frame section having a first coupling;

a second frame section having a second coupling;

one of said first and second couplings comprising a socket;

said second frame section comprising a resilient leaf spring;

said second frame section comprising an arm assembly pivotably mounted below said resilient leaf spring;

a wheel assembly having an axle being disposed transverse to said resilient leaf spring connected to said arm assembly;

a resilient coil spring interposed between said arm assembly and said resilient leaf spring for resiliently suspending said wheel assembly with said resilient coil spring acting in concert with said resilient leaf spring; and said first coupling being removably enagagable with said second coupling through said socket for removably securing said second frame to said first frame section.

10. An improved suspension system for a personal mobility vehicle as set forth in claim 9, further comprising a pair of leaf springs, wherein said arm assembly comprises a pair of arms respectively extending from said resilient leaf springs and said wheel assembly comprises a pair of wheels respectively connected to said pair of arms of said arm assembly.

11. An improved suspension system for a personal mobility vehicle as set forth in claim 9, further comprising a pair of leaf springs, wherein said arm assembly comprises a left and a right arm respectively extending from said resilient leaf springs and said wheel assembly comprises a left and a right wheel of wheels respectively connected to said left and right arms of said arm assembly.

12. An improved suspension system for a personal mobility vehicle as set forth in claim 9, wherein said resilient coil spring comprises a pin extending between said arm assembly and said resilient leaf spring; and said resilient coil spring encircling said pin and interposed between said arm assembly and said resilient leaf spring.

13. An improved suspension system for a personal mobility vehicle, comprising:

a first frame section having a first coupling having a socket;

a second frame section comprising a resilient leaf spring with an end of said resilient leaf spring forming a second coupling;

said second flame section comprising an arm assembly pivotably mounted below said resilient leaf spring;

a wheel assembly having an axle being disposed transverse to said resilient leaf spring connected to said arm assembly;

a resilient coil spring interposed between said arm assembly and said resilient leaf spring for resiliently suspending said wheel assembly with said resilient coil spring acting in concert with said resilient leaf spring; and said first coupling being removably enagagable with said second coupling for removably securing said second frame to said first frame section.

\* \* \* \* \*